(12) United States Patent
Merten et al.

(10) Patent No.: US 8,267,420 B2
(45) Date of Patent: Sep. 18, 2012

(54) HITCH

(75) Inventors: David J. Merten, Manitowoc, WI (US); Jay Z. Muchin, Manitowoc, WI (US)

(73) Assignee: M Group, Inc., Manitowoc, WI (US)

( * ) Notice: Subject to any disclaimer, the term of this patent is extended or adjusted under 35 U.S.C. 154(b) by 830 days.

(21) Appl. No.: 12/243,947

(22) Filed: Oct. 1, 2008

(65) Prior Publication Data

US 2009/0096189 A1 Apr. 16, 2009

Related U.S. Application Data

(60) Provisional application No. 60/979,067, filed on Oct. 10, 2007.

(51) Int. Cl.
*B60D 1/02* (2006.01)

(52) U.S. Cl. .......................... 280/515; 280/514; 411/347

(58) Field of Classification Search .................. 280/514, 280/515; 403/321, 325–28, 330; 411/344, 411/347, 348; 24/411, 453
See application file for complete search history.

(56) References Cited

U.S. PATENT DOCUMENTS

| | | | |
|---|---|---|---|
| 1,974,966 A | 9/1934 | McClure | |
| 2,161,390 A * | 6/1939 | Schmalstieg | 411/344 |
| 2,377,086 A * | 5/1945 | Lang | 411/344 |
| 2,499,712 A * | 3/1950 | Armstrong | 403/316 |
| 2,654,135 A * | 10/1953 | Grizzard et al. | 24/635 |
| 2,898,797 A * | 8/1959 | Bronstein | 411/348 |
| 3,190,677 A | 6/1965 | Robbins | |
| 3,534,650 A * | 10/1970 | Kubokawa | 411/344 |
| 4,125,048 A * | 11/1978 | Hardin | 411/344 |
| 5,199,733 A | 4/1993 | De Lorme | |
| 5,517,734 A * | 5/1996 | Korpi | 24/453 |
| 6,193,261 B1 | 2/2001 | Hahka | |
| 6,338,591 B1 * | 1/2002 | Lilienthal, II | 403/326 |
| 6,752,562 B2 * | 6/2004 | Mills et al. | 403/322.1 |

FOREIGN PATENT DOCUMENTS

GB 250663 4/1925

* cited by examiner

*Primary Examiner* — Lesley D Morris
*Assistant Examiner* — Maurice Williams
(74) *Attorney, Agent, or Firm* — Rathe Lindenbaum LLP

(57) ABSTRACT

A hitch system includes a handle portion including a handle loop, a pin portion extending from the handle portion, a pair of opposite retainers and a trigger. The retainers are movable between a retracted position relative to the pin portion and an extended position relative to the pin portion. The trigger is coupled to the retainers to actuate the retainers between the retracted position and the extended position.

20 Claims, 9 Drawing Sheets

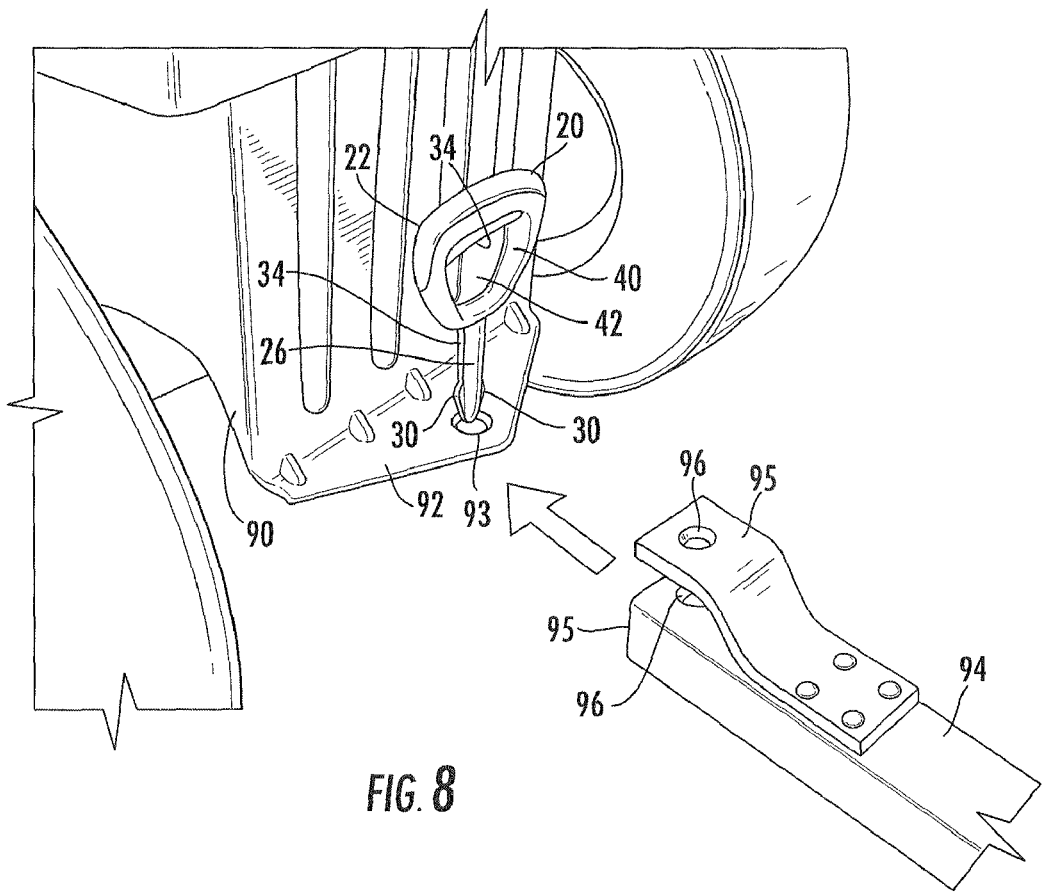
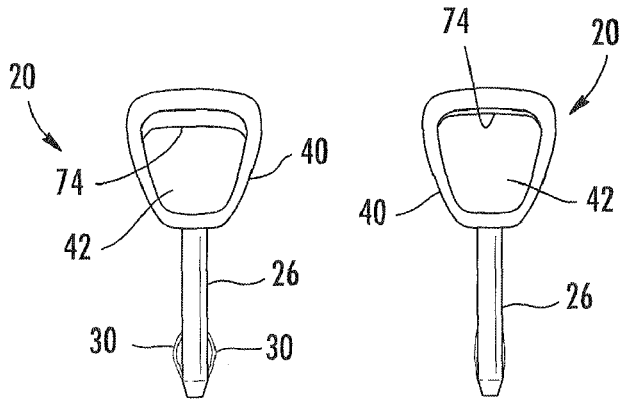
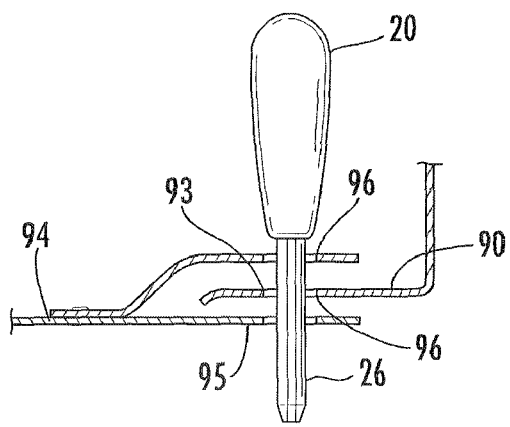
FIG. 8
FIG. 9    FIG. 10
FIG. 11

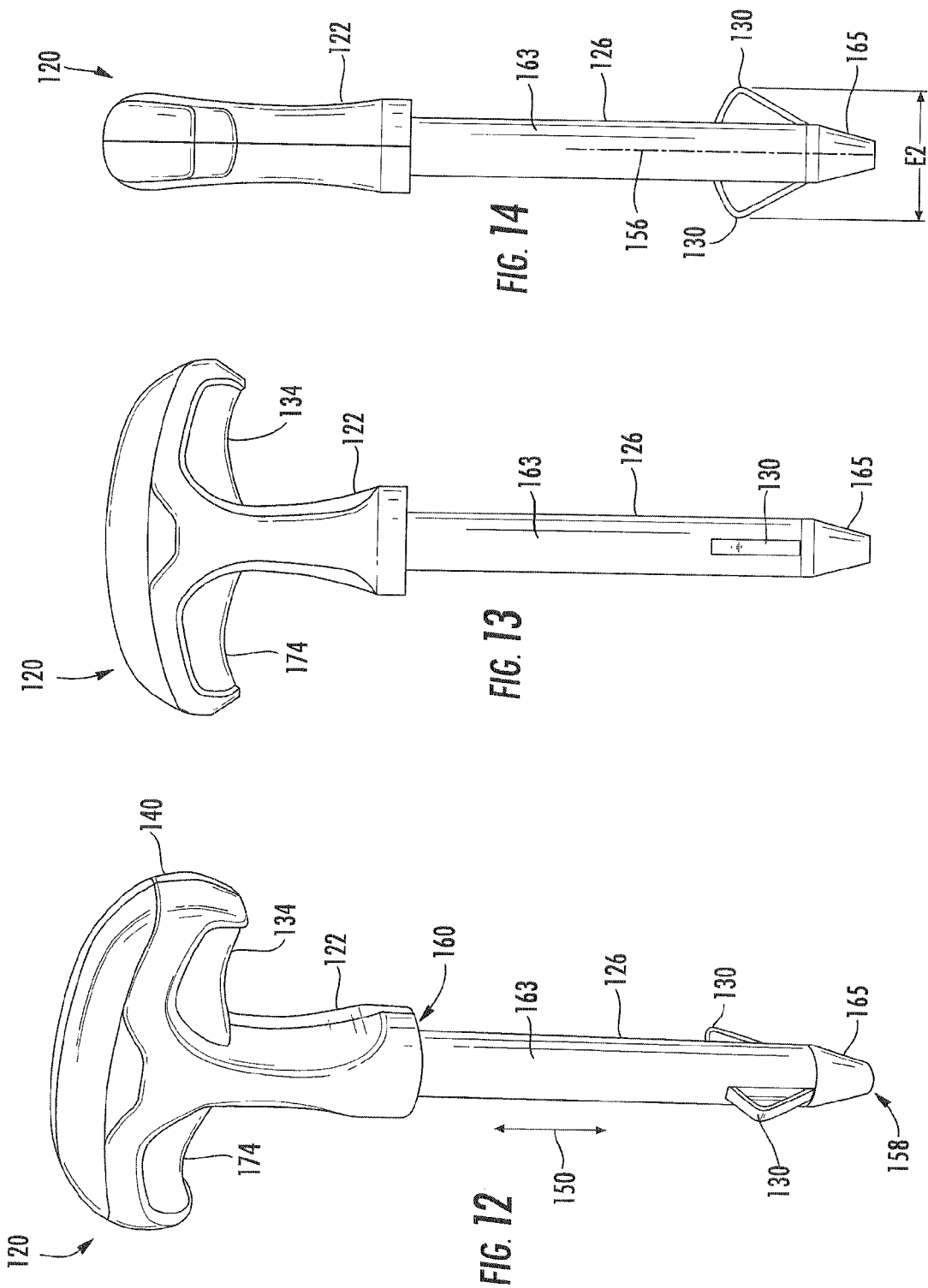

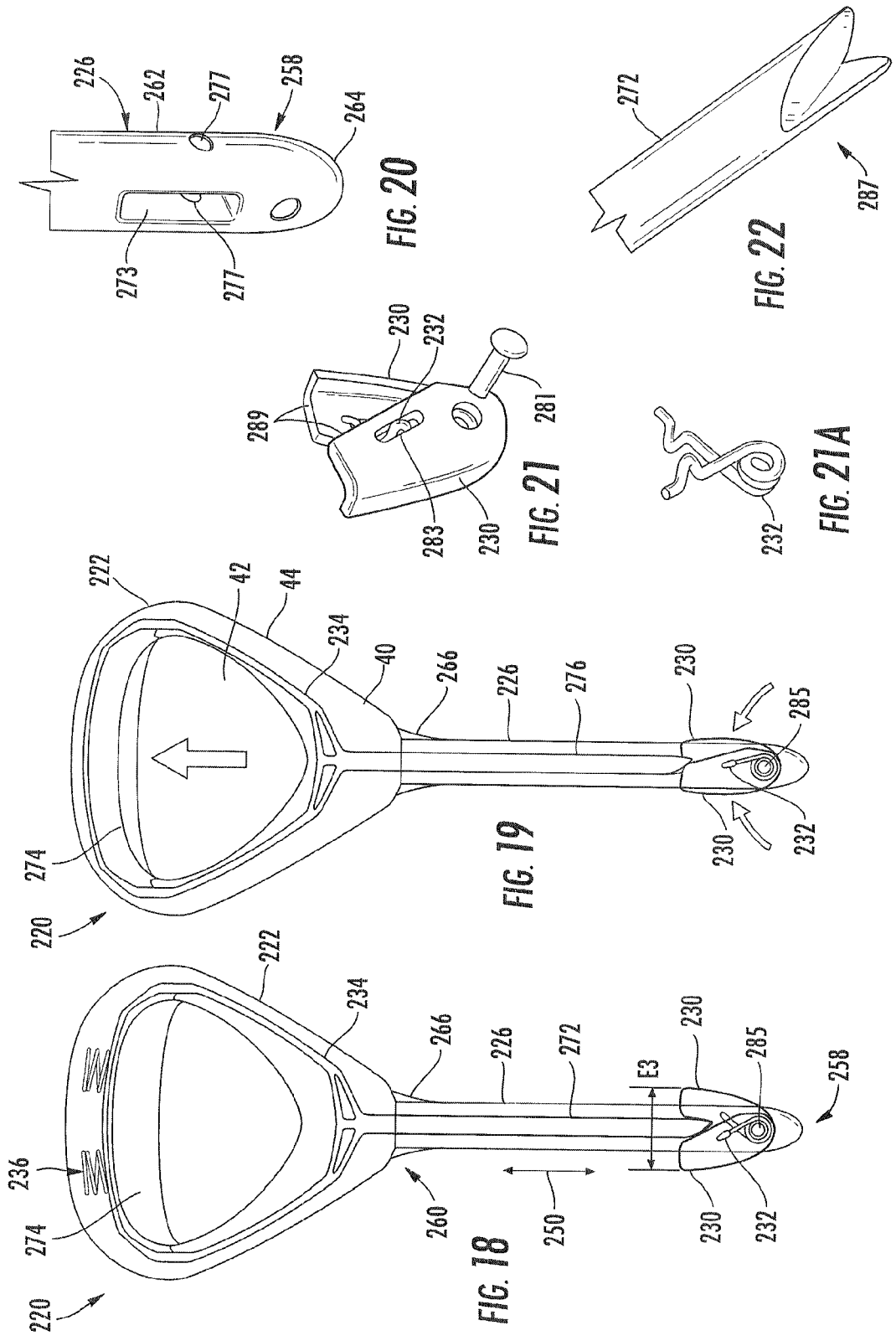

HITCH

CROSS-REFERENCE TO RELATED PATENT APPLICATIONS

The present application claims priority under 35 USC 119 from U.S. Provisional Application Ser. No. 60/979,067 filed on Oct. 10, 2007 by David J. Merten and Jay Z. Muchin and entitled HITCH, the full disclosure of which is hereby incorporated by reference.

BACKGROUND

Many hitch systems utilize a hitch pin which is inserted through a vehicle hitch. A cotter pin is used to retain the hitch pin on the hitch. Attaching and removing the cotter pin often requires a person to dismount the vehicle and requires two free hands. Other current hitch systems that attempt to address this problem are complex, expensive and remain difficult to use.

BRIEF DESCRIPTION OF THE DRAWINGS

FIG. 8 is a fragmentary perspective view illustrating the hitch system of FIG. 1 being used to connect a vehicle to implement.

FIG. 9 is a front elevational view illustrating the hitch system of FIG. 1 with retainers in extended positions.

FIG. 10 is a front elevational view illustrating the hitch system of FIG. 1 with retainers in retracted positions.

FIG. 11 is a side elevation overview of the hitch system of FIG. 8 illustrating the hitch system inserted through allowing flight of openings (shown in section) of the vehicle and the implement.

FIG. 12 is a perspective view of another embodiment of the hitch system of FIG. 1 according to having sample embodiment.

FIG. 13 is a front elevational view of the hitch system of FIG. 12.

FIG. 14 is a side elevation overview of the hitch system of FIG. 12.

FIG. 6 is a perspective view illustrating the hitch system of FIG. 12 prior to actuation of a trigger.

FIG. 18 is a side elevational view of another embodiment of the hitch system of FIG. 1 prior to actuation of a trigger and with portions transparent for purposes of illustration.

FIG. 19 is a side elevational view over the hitch system of FIG. 18 during actuation of the trigger and with portions transparent for purposes of illustration.

FIG. 20 is a fragmentary perspective view of a portion of the hitch system of FIG. 18 with retainers removed for purposes of illustration.

FIG. 21 is a perspective view of the retainers of the hitch system of FIG. 18.

FIG. 21A is a perspective view of a bias for the retainers of FIG. 21.

FIG. 22 is fragmentary perspective view of a push pin portion of the trigger of the hitch system of FIG. 18.

DETAILED DESCRIPTION OF THE EXAMPLE EMBODIMENTS

Figure 1:
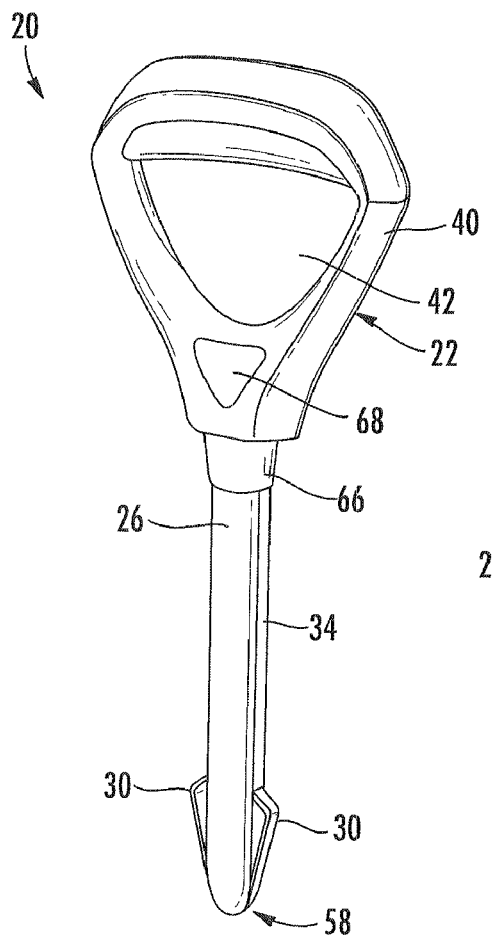
FIG. 1 is a perspective view of a hitch system according to an example embodiment.
Figure 2:
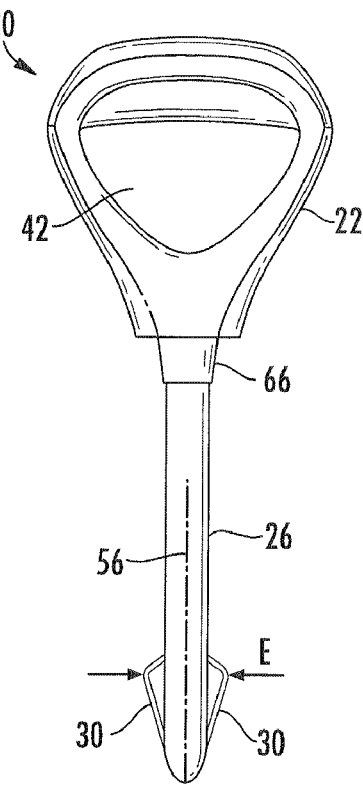
FIG. 2 is a front elevation overview of the hitch system of FIG. 1.
Figure 3:
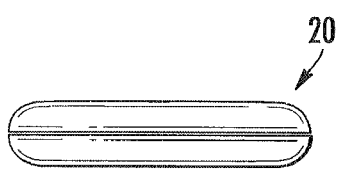
FIG. 3 is a top plan view of the hitch system of FIG. 1.
Figure 4:
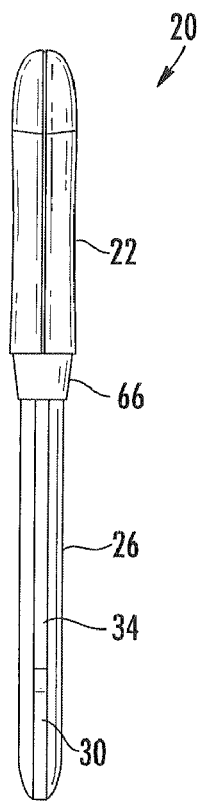
FIG. 4 is a side elevation will view of the hitch system of FIG. 1.
Figure 5:
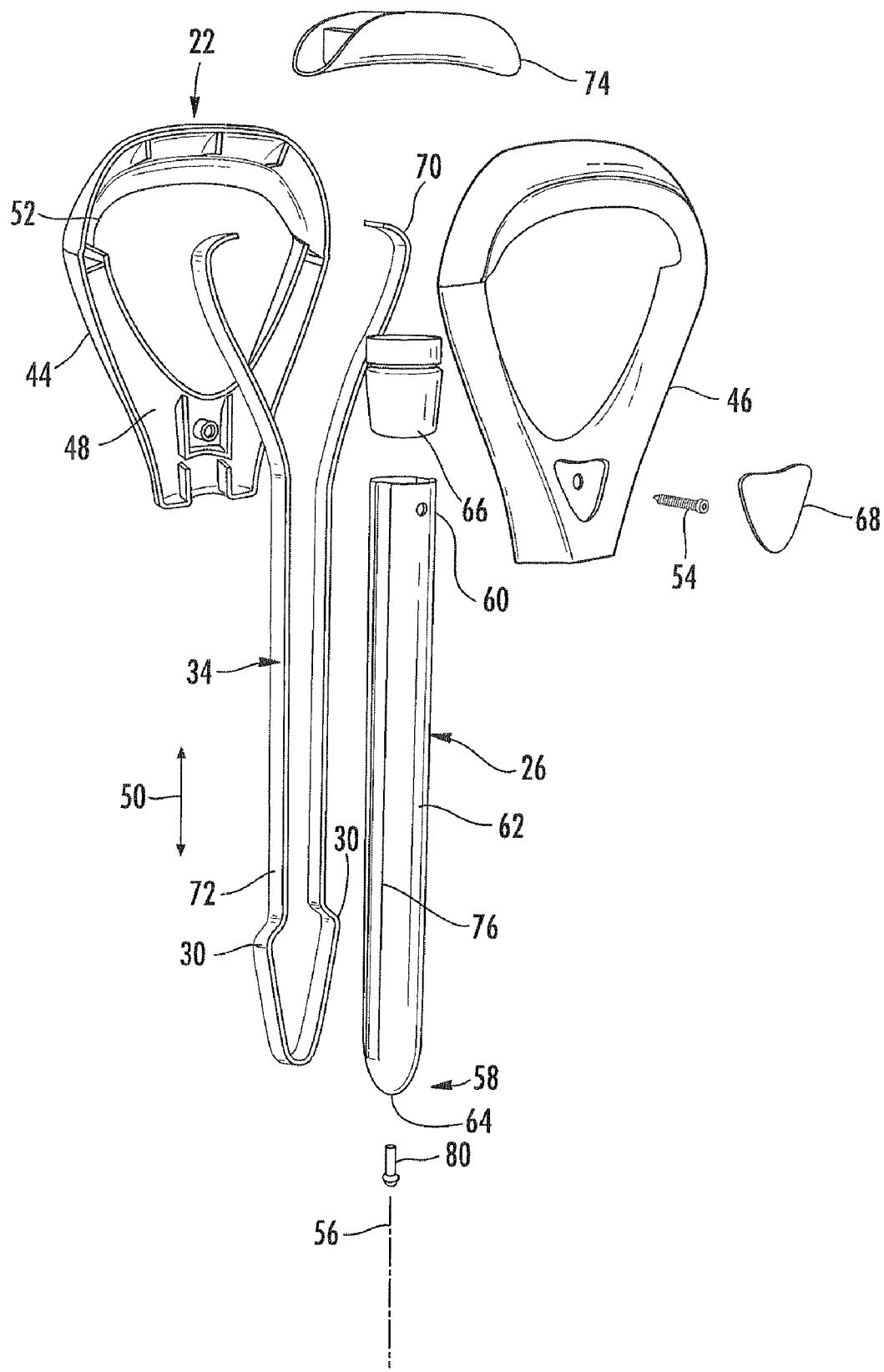
FIG. 5 is an exploded perspective view of the hitch system of FIG. 1.

FIGS. 1-5 illustrate hitch system 20 according to an example embodiment. FIG. 1 is a perspective view, FIGS. 2-4 are orthogonal views and FIG. 5 is an exploded perspective view. As shown by FIGS. 1-5, hitch system 20 includes handle portion 22, pin portion 26, retainers 30 and trigger 34. Handle portion 22 comprise a structure by which a person may grip or grasp hitch system 20. In the example illustrated, handle portion 22 comprises a handle loop 40 having a central opening 42 through which a person may position his or her fingers to grasp and carry hitch system 20. Although handle loop 40 is illustrated as being substantially circular, in other embodiments, loop portion 40 may have other shapes. For example, loop portion 40 may alternatively be ovular or polygonal such as square, rectangular, decagonal, hexagonal, octagonal and the like.

As shown in FIG. 5, in the particular example illustrated, handle portion 22 includes back end front handle housings 44, 46. Housings 44 and 46 each include an interior channel or cavity 48 which receives portions of trigger 34. In the example illustrated, cavities 48 are configured to facilitate movement of trigger 34 and directions indicated by arrow 50. Housing 44 further include an opening 52 from which trigger 34 may project for being engaged and actuated. When housings 44, 46 are joined to one another, such as by fastener 54, housing 44, 46 form handle loop 40 while securing pin portion 26 and capturing trigger 34 therebetween. In other embodiments, handle portion 22 may have other configurations.

Pin portion 26 comprises an elongate rod, pin, shaft or other structure having a diameter configured to be inserted through an opening of a hitch flange or structure. Pin portion 26 extends from handle portion 22 along an axis 56. Pin portion 26 supports retainers 30 at its distal end 58 while being coupled to handle portion 22 at its proximal end 60. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

As shown by FIG. 5, in the particular example illustrated, pin portion 26 includes a cylindrical shaft 62 having a conical, rounded, pointed tip 64 at distal end 58. Pin portion 26 further includes an elastomeric plug serving as interface between shaft 62 and handle portion 22. As shown by FIG. 1, plug 66 projects from a lower end of handle portion 22. Plug 66 provides a compressible structure having an outer diameter greater than the outer diameter of pin portion 26 and is configured to engage the top surfaces about or inner surfaces above openings in a hitch flange to reduce vibration and rattling. In other embodiments, plug 66 may be omitted.

Fastener 54 extends; through housings 44, 46, shaft 62 and plug 66 to connect pin portion 26 to handle portion 22. In the example illustrated, fastener 54 is covered and concealed with a cover or badge 68. In other embodiments, pin portion 26 may have other configurations and may be coupled to handle portion 22 in other fashions.

Retainers 30 comprise tabs, extensions, wings, hooks, catches or other structures supported by pin portion 26 outwardly projecting from pin portion 26 proximate to a distal end 58 of pin portion 26. The retainers 30 are configured to move or actuate between a retracted position relative to pin portion 26 and an extended positioned relative to pin portion 26. In the retracted position, retainers 30 are sufficiently close to pin portion 26 along axis 56 such that retainers 30 and pin portion 26 may pass through an opening of a hitch flange. In one embodiment, retainers 30, in the retracted position, are completely received within an outer diameter of pin portion 26. In other embodiments, retainers 30, when in the retracted position, may partially project beyond an outer diameter of pin portion 26 while still being sufficiently close to axis 56 such that pin portion 26 may be inserted through the opening of a hitch flange. In the extended positioned, retainers 30 sufficiently project outwardly from pin portion 26 so as to engage in underside of a flange about an opening of a hitch flange to inhibit withdrawal of pin portion 26 through the opening of the hitch flange. According to one embodiment, retainers 30, when in the extended position, have an outer extent E (the distance spacing those points on retainers 30 contained within a single plane intersecting axis 56 and farthest away from axis 56) (shown in FIG. 2) of greater than about 0.75 inches. When in the retracted positions, retainers 30 have an outer extent E of less than about 0.75 inches. In such an embodiment, retainers 30 are well suited for lawnmower and garden tractor hitches. In other embodiments, retainers 30 may have other outer extents when in the retracted and extended positions depending upon a diameter of the opening or hole of the vehicle hitch flange or implement hitch flange.

In the particular example illustrated, retainers 30 comprise resiliently flexible portions formed from a resiliently flexible material, such as spring steel. In one embodiment, at rest, retainers 30 are resiliently biased to their extended positions. Upon actuation of trigger 34, retainers 30 resiliently flex to their retracted positions. In one embodiment, as trigger 34 is moved along axis 56 towards handle portion 22, retainers 30 resiliently constrict towards axis 56 to their retracted positions. In other embodiments, this relationship may be reversed.

Trigger 34 comprises one or more members or mechanisms configured to actuate retainers 30 between their retracted positions and their extended positions. In the particular example illustrated, trigger 34 extends from handle portion 22 along pin portion 26 to retainers 30. Movement of trigger 30 along axis 56 actuates retainers 34.

In the particular example illustrated in FIG. 5, trigger 34 includes a trigger loop portion 70, intermediate connection portion 72 and trigger grip 74. Loop portion 70 extends at least partially within handle portion 22. Loop portion 70 extends through cavity 48 and into opening 52. Loop portion 70 extends substantially concentric with respect to opening 42 (shown in FIG. 1).

Intermediate portion 72 extends between loop portion 70 and retainers 30. In the particular example illustrated, intermediate portion 34 is integrally formed as a single unitary body with loop portion 70. In the particular example illustrated, intermediate portion 34 is further integrally formed as part of a single unitary body with retainers 30. In the example illustrated trigger loop portion 70, intermediate portion 34 and retainers 30 are integrally formed out of a spring steel ribbon. As a result, cost and complexity is reduced. In other embodiments, such components may be separately formed and connected to one another such as being welded, bonded or fastened to one another.

In one embodiment, the ribbon is secured at distal end 58 of pin portion 62 by a fastener 80. In other embodiment, distal end 58 may include a cavity or notch receiving the ribbon.

As shown by FIGS. 1-5, intermediate connection portion 72 extends along pin portion 26. In the example illustrated, connection portion 72 extends within an elongate channel or groove 76 formed within shaft 62 of pin portion 26. As a result, portion 72 does not substantially increase an outer diameter of pin portion 26. In other embodiments, portion 72 may simply extend along an outside of pin portion 26 or may extend within a hollow recess or cavity formed in shaft 62, wherein retainers 30 project through side apertures within shaft 62.

Trigger grip 74 comprises a structure coupled to trigger loop portion 70 facilitating gripping of trigger loop portion 70 within opening 42 of handle portion 22. Trigger grip 74 is located along axis 56 and is configured to facilitate movement of trigger 34 along axis 56. In other embodiments, trigger loop portion 70 may be continuous, omitting ends, wherein grip 74 may envelop or extend around portions of trigger loop 70 or wherein grip 74 may be omitted.

Figure 6:
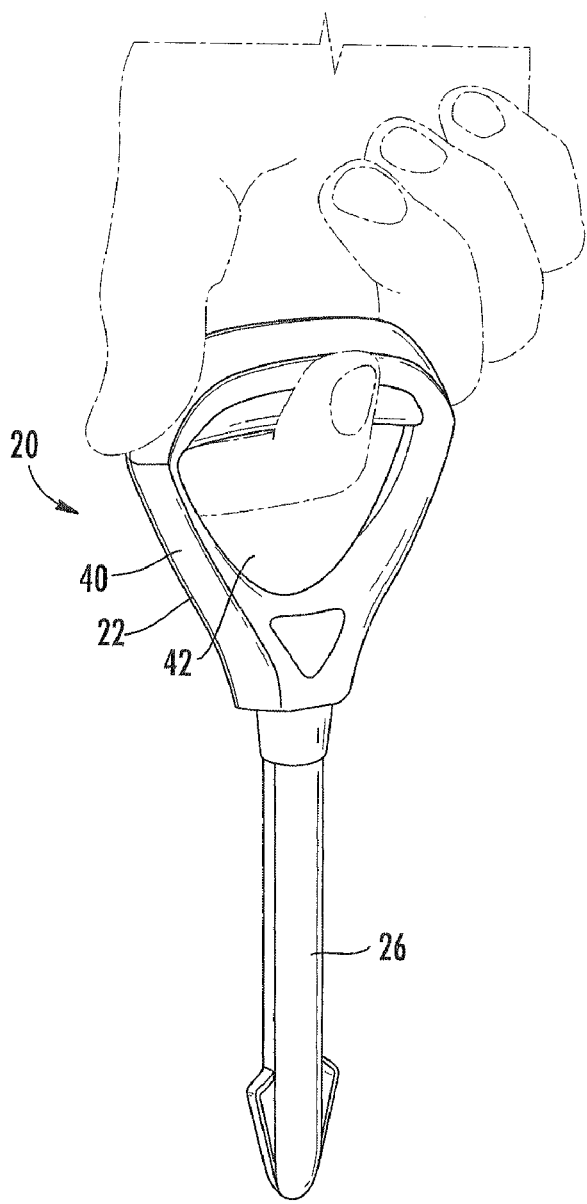
FIG. 6 is a perspective view illustrating the hitch system of FIG. 1 prior to actuation of a trigger.
Figure 7:
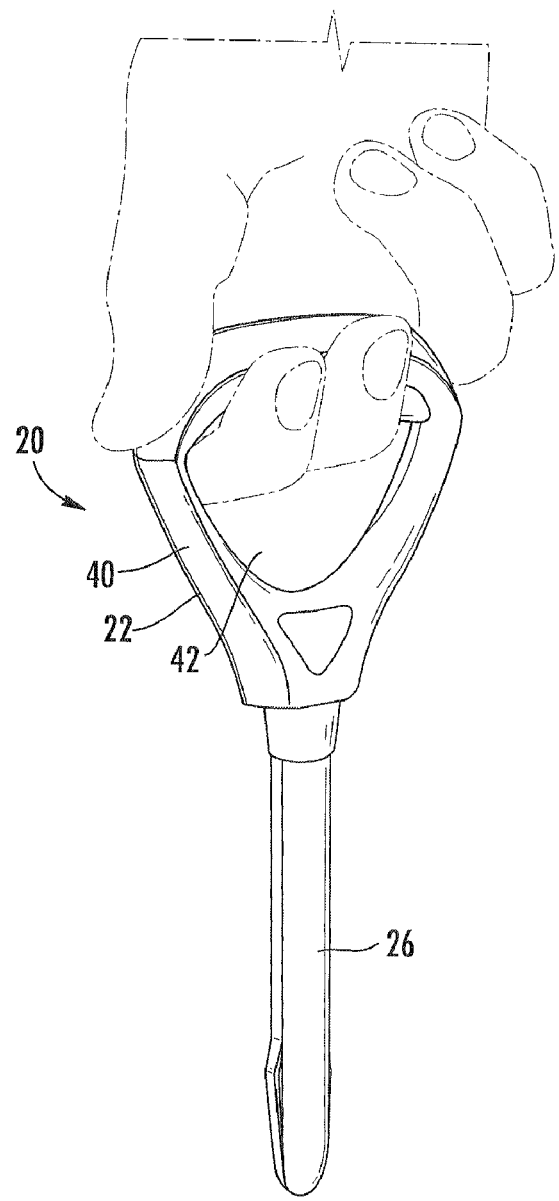
FIG. 7 is a perspective view illustrating the hitch system of FIG. 1 during actuation of the trigger.

FIGS. 6-11 illustrates use of hitch system 20. FIGS. 6-7 illustrate example models of hitch system 20 being gripped. As shown by FIGS. 6 and 7, handle portion 22 is configured such that one or more fingers of a person's hand may pass through opening 42 during insertion or removal. Because handle portion 22 includes a handle loop 40, hitch system 20 may be more easily and securely grasped with a single hand.

FIGS. 8-11 illustrate hitch system 20 with respect to a vehicle 90 having a flange 92 with an opening 93 and an implement 94 having one or more flanges or bars 95 with openings 96. FIG. 11 is a sectional view illustrating insertion of hitch system 20 within portion 26 extending through openings 93 and 96 to secure implement 94 to vehicle 90. During insertion of pin portion 26 through opening 93 and 96, retainers 30 engage portions of openings 93 and 96 and are forced upwardly and inwardly until retainers 30 have passed through the lowermost opening 96. Alternatively, a person may pull up on trigger 34 to constrict retainers 30 during such insertion. After retainers 30 have been lowered below opening 96, retainers 30 resiliently return to their initial or natural extended positions (shown in FIG. 9) upon release of trigger 34. As a result, retainers 30 inhibit withdrawal of pin portion 26 from openings 93 and 96, securing implement 94 to vehicle 90.

To disconnect implement 94 from vehicle 90, a person pulls up on trigger, constricting retainers 30 (shown in FIG. 10). Hitch system 20 may be withdrawn from openings 9396 by a person pulling up on handle portion 22. As a result, hitch system 20 may be connected or disconnected from flanges 92 and 95 by a single hand of a person. Moreover, hitch system 20 may be connected and disconnected without a person having to reach below flanges 92 and 95.

Figure 15:
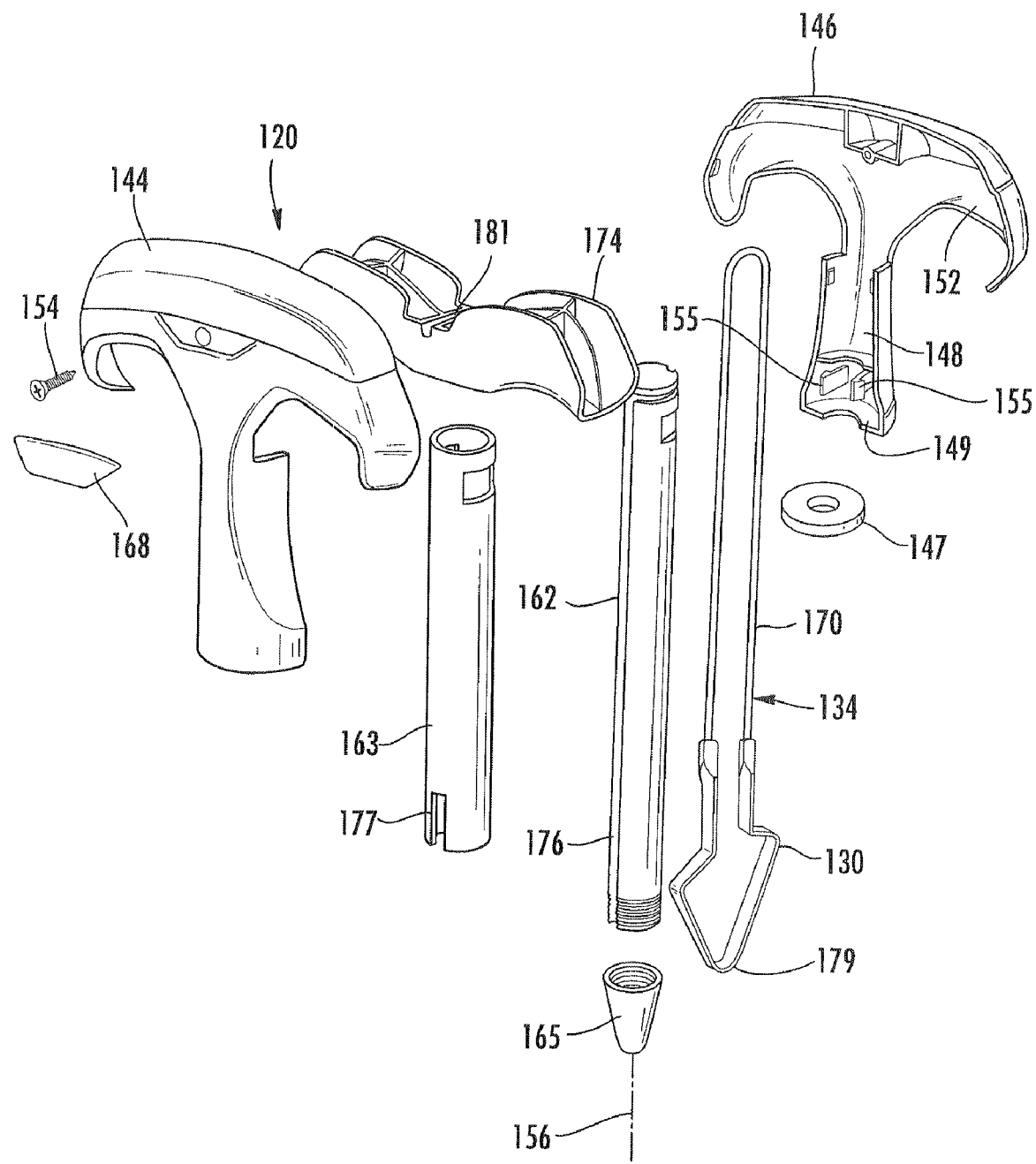
FIG. 15 is an exploded perspective view of the hitch system of FIG. 12.

FIGS. 12-15 illustrate hitch system 120, another embodiment of hitch system 20 according to an example embodiment. FIG. 12 is a top perspective view. FIG. 13 is a front elevational view. FIG. 14 of the side elevation of view. FIG. 15 is an exploded perspective view. Hitch system 120 includes handle portion 122, pin portion 126, retainers 130 and trigger 134.

Handle portion 122 comprise a structure by which a person may grip or grasp hitch system 120. In the example illustrated, handle portion 122 comprises a T-shaped grip 140 about which a person may position his or her fingers to grasp and carry hitch system 120. Although grip 140 is illustrated as being substantially T-shaped, in other embodiments, grip 140 may have other shapes, such as an inverted L shape.

As shown in FIG. 15, in the particular example illustrated, handle portion 122 includes back and front handle housings 144, 146 (with overmold) and magnet 147. Housings 144 and 146 each include an interior channel or cavity 148 which receives portions of trigger 134. In the example illustrated, cavities 148 are configured to facilitate movement of trigger 134 in directions indicated by arrow 150. Housings 144,146 further include an opening 152 from which trigger 134 may project for being engaged and actuated. When housings 144, 146 are joined to one another, such as by fastener 154 and snaps 155, housings 144, 146 form handle grip 140 while securing pin portion 126 and capturing trigger 134 therebetween. As further shown by FIG. 15, a cover or badge 168 may be utilized to conceal faster 154. In other embodiments, handle portion 122 may have other configurations.

Magnet 147 comprises a mass of magnetic material received within a lower end of housings 144, 146, such as within cavity 149. Alternatively, magnet 147 may be secured to an exterior and lower end of housings 146, 147. Magnet 147 is configured to magnetically attract a lower end of handle portion 122 to the iron or steel metal of a vehicle or implement hitch flange, to reduce vibration or rattling therebetween. In other embodiments, magnet 147 may be omitted.

Pin portion 126 comprises an elongate rod, pin, shaft or other assembly having a diameter configured to be inserted through an opening of a hitch flange or structure. Pin portion 126 extends from handle portion 122 along an axis 156. Pin portion 126 supports retainers 130 at its distal end 158 while being coupled to handle portion 122 at its proximal end 160.

As shown by FIG. 5, in the particular example illustrated, pin portion 126 includes shaft 162, sleeve 163 and cap 165. Shaft 162 comprise an elongate rod or member including a pair of opposite grooves 176 which receive portions of trigger 134 and facilitate movement of trigger 134 along axis 156. Shaft 162 has a lower end coupled to cap 165 so as to capture a lower end of the containers 130 between cap 165 and shaft 162.

Sleeve 163 extends over and around shaft 162 with portion the trigger 134 captured therebetween. Sleeve 163 includes notches or slots 177 which receive portions of retainer 130 during retraction or constriction of retainers 130. Sleeve 163 protects portion of the trigger 134 during insertion and withdrawal of pin portion 26 through openings in the hitch flange. In other embodiments, sleeve 163 maybe omitted.

Cap 165 is connected to a lower end of shaft 176 with a lower tip 179 of retainers 130 received within cap 165 are captured between shaft 162 and cap 165. In particular example illustrated, cap 165 is incredibly coupled to shaft 162. In other embodiments, cap 165 may be secured to shaft 162 in other manners. In still other embodiments, cap 165 may be omitted where retainers 130 are secured to shaft 162 by other mechanisms.

Retainers 130 comprise tabs, extensions, wings, hooks, catches or other structures supported by pin portion 126 outwardly projecting from pin portion 126 proximate to a distal end 158 of pin portion 126. The retainers 130 are configured to move or actuate between a retracted position relative to pin portion 126 and an extended position relative to pin portion 126. In the retracted position, retainers 130 are sufficiently close to pin portion 126 along axis 156 such that retainers 130 and pin portion 126 may pass through an opening of a hitch flange. In one embodiment, retainers 130, in the retracted position, are completely received within an outer diameter of pin portion 126. In other embodiment, retainers 130, when in the retracted position, a partially project beyond an outer diameter of pin portion 126 while still being sufficiently close to axis 156 such that pin portion 126 may be inserted through the opening of a hitch flange. In the extended positioned, retainers 130 sufficiently project outwardly from pin portion 126 so as to engage in underside of an opening of a hitch flange to inhibit withdrawal of pin portion 1265 through the opening of the hitch flange.

According to one embodiment, retainers 130 when in the extended position, have an outer extent E2 (the distance spacing those points on retainers 130 contained within a single plane intersecting axis 156 and farthest away from axis 156) (shown in FIG. 14) of greater than about 0.75 inches. When in the retracted position, retainers 130 have an outer extent E2 of less than about 0.75 inches. In such an embodiment, retainers 130 are well suited for lawnmower and garden tractor hitches. In other embodiment, retainers 130 may have other outer extents when in the retracted and extended positions depending upon a diameter of the opening or hole of the vehicle hitch flange or implement hitch flange.

In the particular example illustrated, retainers 130 comprise resiliently flexible portions formed from a resiliently flexible material, such as spring steel. In one embodiment, at rest, retainers 130 are resiliently biased to their extended positions. Upon actuation of trigger 134, retainers 130 resiliently flex to their retracted positions. In one embodiment, as trigger 134 is moved along axis 156 towards handle portion 122, portion 130 resiliently constrict towards axis 156 to their retracted positions. In other embodiments, this relationship may be reversed.

Trigger 134 comprises one or more members or mechanisms configured to actuate retainers 130 between the retracted positions and their extended positions. In a particular example illustrated, trigger 134 extends from handle portion 122 along pin portion 26 to retainers 130. Movement of trigger 130 along axis 156 actuates retainers 134.

In the particular example illustrated in FIG. 15, trigger 34 includes a loop portion 70 of material such as a steel cable and a trigger release or grip 174. Loop portion 170 extends at least partially within handle portion 22. Loop portion 70 extends through cavity 148 and is coupled to grip 174. In the particular embodiment, loop portion 170 is coupled to grip 174 by wrapping about a portion of grip 174 and sitting within a channel 181. In one embodiment loop 170 is welded, pinched or otherwise secured to retainers 130. In yet another embodiment, loop portion 170 may be integrally formed as part of single unitary body with retainers 130.

Grip 174 comprises structured configured to be connected to loop 170 and to serve as an interface between trigger 134 and the hand of a person grasping handle portion 122. Grip 174 is located within opening 152 of the handle portion 122. Grip 174 enables a person to pull-up upon grip 174 with his or her fingers to draw loop portion 170 upward along axis 156 towards handle portion 122. This results in retainers 130 being drawn further upward between shaft 162 and sleeve 163 to constrict retainers 130 and to actuate retainers 130 to their retracted positions. Release of grip 174 causes retainers 130 to resiliently return to their natural shape, moving loop portion 170 and grip 174 downward along axis 156 away from handle portion 122.

Figures 16, 17:
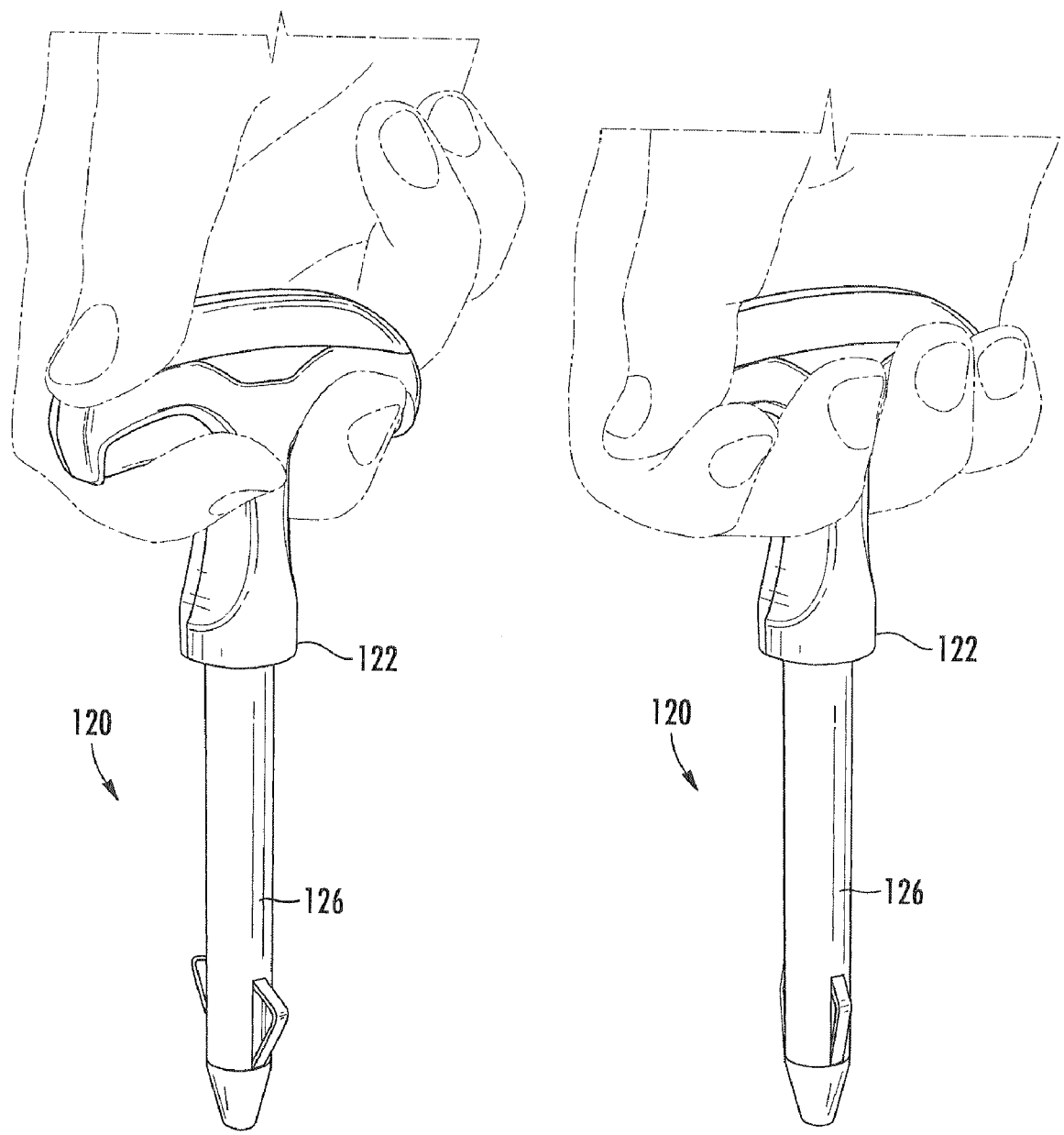
FIG. 17 is a perspective view illustrating the hitch system of FIG. 12 during actuation of the trigger.

FIG. 16 and 17 illustrate a model of hitch system 120. FIGS. 16 and 17 illustrate gripping of handle portion 122. As shown, hitch system 120 enables a person to grasp handle portion 122 with a single hand using two or more of his or her fingers. At the same time that hitch system 120 is being grasped, a person may selectively actuate trigger 134 to actuate retainers 130 from their natural extended positions to retracted positions to facilitate insertion or withdrawal of pin portion 126 from openings of a vehicle and/or implement hitch flange. As with hitch system 20, hitch system 120 enables connection and disconnection of an implement and vehicle with a single hand of a person and without requiring a person to reach beneath the hitch flange of the vehicle or implement.

FIGS. 18-24 illustrate hitch system 220, another embodiment of hitch system 20. Hitch system 220 includes handle portion 222, pin portion 226, retainers 230, bias 232, trigger 234 and bias 236. Handle portion 222 comprise a structure by which a person may grip or grasp hitch system 220. Handle portion 222 is substantially similar to handle portion 22 described above and FIGS. 1-5. In the example illustrated, handle portion 222 comprises a handle loop 40 having a central opening 42 through which a person may position his or her fingers to grasp and carry handle system 220. Although handle loop 40 is illustrated as being substantially circular, and other embodiment, who portion 40 may have other shapes. For example to loop portion 40 may alternatively be ovular or polygonal such as square, rectangular, decagonal, hexagonal, octagonal and the like in overall shape.

As shown in FIG. 5, in the particular example illustrated, handle portion 222 includes back in front handle housings 44, 46. Housings 44 and 46 each include an interior channel or cavity 43 which receives portions of trigger 34. In the example illustrated, cavities 48 are configured to facilitate movement of trigger 34 in directions indicated by arrow 250 (as seen in FIG. 18). Housing 44 further include an opening 52 from which trigger 34 may project for being engaged and actuated. When housings 44, 46 are joined to one another, such as by fastener 54, housing 44, 46 form handle loop 40 while securing pin portion 26 in capturing trigger 34 therebetween. In other embodiments, handle portion 222 may have other configurations.

Pin portion 226 comprises an elongate rod, pin, shaft or other structure having a diameter configured to be inserted through an opening of a hitch flange or structure. Pin portion 226 extends from handle portion 222 along an axis 256. Pin portion 226 supports retainers 230 at its distal end 258 while being coupled to handle portion 222 at its proximal end 260.

As shown by FIG. 20, in the particular example illustrated, pin portion 226 includes a cylindrical shaft 262 having a conical, rounded, pointed tip 264 at distal end 258. Distal end 258 of shaft 262 further includes a through slot 273 which is in communication with an internal passage 276 extending along axis 256 through shaft 262 to a location in communication with cavity 48 of housings 44, 46 (shown in FIG. 5). Distal end 258 further includes a pair of opposite openings 277 facilitating pivotal connection and support of retainers 230 at distal and 258.

Pin portion 226 further includes an elastomeric plug 266 serving as interface between shaft 262 and handle portion 222. Plug 266 projects from a lower end of handle portion 222. Plug 266 provides a compressible structure having an outer diameter greater than the outer diameter of pin portion 226 and is configured to engage the top surfaces about or inner surfaces above openings in a hitch flange to reduce vibration and rattling. In other embodiments, plug 266 may be omitted.

Retainers 30 comprise tabs, extensions, wings, stampings, hooks, catches or other structures supported by pin portion 226 outwardly projecting from pin portion 226 proximate to a distal end 258 of pin portion 226. The retainers 230 are configured to move or actuate between a retracted position relative to pin portion 26 and an extended positioned relative to pin portion 226. In the retracted position, retainers 230 are sufficiently close to pin portion 226 along axis 256 such that retainers 230 and pin portion 226 may pass through an opening of a hitch flange. In one embodiment, retainers 230, in the retracted position, are completely received within an outer diameter of pin portion 226 within slot 273. In other embodiment, retainers 230, when in the retracted position, a partially project beyond an outer diameter of pin portion 226 while still being sufficiently close to axis 256 such that pin portion 226 may be inserted through the opening of a hitch flange. In the extended positioned, retainers 30 sufficiently project outwardly from pin portion 226 so as to engage in underside of an opening of a hitch flange to inhibit withdrawal of pin portion 226 through the opening of the hitch flange.

According to one embodiment, retainers 230 when in the extended position, have an outer extent E3 (the distance spacing those points on retainers 230 contained within a single plane intersecting axis 256 and farthest away from axis 256) (shown in FIG. 18) of greater than about 0.75 inches. When in the retracted position (shown in FIG. 19), retainers 230 have an outer extent E3 of less than about 0.75 inches. In such an embodiment, retainers 30 are well suited for lawnmower and garden tractor hitches. In other embodiment, retainers 30 may have other outer extents when in the retracted and extended positions depending upon a diameter of the opening or hole of the vehicle hitch flange or implement hitch flange.

Bias 232 comprises one or more members operably coupled between retainers 230 and a remainder of hitch system 220 that are configured to resiliently bias retainers 230 towards their retracted positions (shown in FIG. 19). In the particular example illustrated, bias 232 comprises one or more springs. In the particular example illustrated, bias 232 comprises a single spring operably connected to both retainers 230 so as to bias retainers 230 in substantial unison with one another. As shown by FIG. 21A, in one embodiment, bias 232 they comprise a torsion spring captured between symmetrical retainers or stampings and configured to pull them in to their retracted position.

FIG. 21 illustrates one example of how bias 232 may be coupled to retainers 230. As shown by FIG. 21, retainers 230 are secured to distal and 258 of shaft 262 by a rivet, pin, bolt or other fastener 281 secured through openings 277 (shown in FIG. 20). As a result, retainers 230 pivot about a single common axis, simplifying the construction of hitch system 220 and increasing the compactness of hitch system 220, enabling hitch system 220 to be utilized with smaller hitch flange openings.

As further shown by FIG. 21, bias 232 is captured between retainers 230 and engages retainers 230 through slot 283 within each of retainers 230. As a result, absent any external force applied by trigger 234, bias 231 pivots retainers 230 about axis 285 to constricted or retracted positions, facilitating insertion in withdrawal of hitch system 220 into a vehicle or implement hitch flange openings.

Trigger 234 comprises one or more members or mechanisms configured to actuate retainers 230 between their retracted positions and their extended positions. In the particular example illustrated, trigger 234 extends from handle portion 222 along and within passage 276 of pin portion 226 to retainers 230. Movement of trigger 230 along axis 256 actuates retainers 234. In the particular example illustrated, trigger 234 moves between: (1) an at rest, locking position (shown in FIG. 18) in which trigger 134 retains retainers 230 against the biasing force of bias 232 in the extended positions and (2) a releasing position in which trigger 234 is disengaged, separated from and out of contact with retainers 230 or is in contact with retainers 230 but is sufficiently withdrawn along axis 256 towards handle portion 222 such that bias 232 is able to position her chance 230 in their retracted positions.

In the particular example illustrated in FIG. 15, trigger 34 includes a trigger loop portion 270, pushpin portion 272 and grip portion 274. Loop portion 270 extends at least partially within handle portion 222. Loop portion 270 extends through cavity 48) shown in FIG. 5) and is coupled to grip portion 274. In the particular example illustrated, loop portion 270 continuously extends about opening 42. In other embodiments, loop portion 270 may discontinuously extend about opening 42, having ends.

Pushpin portion 272 extends from loop portion 270 along axis 256 into engagement with retainers 230 within passage 276. As shown by FIG. 22, pushpin portion 276 as a distal end 287 that is forked as shown such that distal end 287 may simultaneously contact and engage edges 289 of retainers 230 (shown in FIG. 21). The pushpin portion 272 is configured such that downward movement of pushpin portion 276 along axis 256 in a direction away from handle portion 222 presses upon retainers 230 against the biasing force provided by bias 232 to move retainers 230 to their extended positions shown in FIG. 18. Alternatively, withdrawal of pushpin portion 276 from retainers 230 along axis 256 in a direction towards handle portion 222, permits bias 232 to move retainers 230 inwardly towards axis 256 to their retracted positions.

Grip portion 274 is connected to loop portion 270 within the opening 42. Grip portion 274 provides a smooth comfortable gripping surface at which a person's hand may interface with trigger 234. As shown by FIGS. 18 and 19, in one embodiment, grip portion 274 is integrally formed as a single unitary body with loop portion 270. In one particular embodiment, grip portion 274 is further integrally formed as part of a single unitary body with pushpin portion 272. In one embodiment, the entirety of trigger 234 is integrally formed as a single unitary body from one or more polymers. Because trigger 234 is formed as a single unitary body, fabrication and assembly of hitch system 220 is simplified and costs are reduced. In another embodiment, trigger 234 may be formed from other materials or may be formed from distinct components which are fastened, welded, bonded, glued or otherwise joined to one another.

Bias 236 comprises one or more members configured to resiliently bias trigger 234 towards its locking position. Bias 236 is configured to apply a biasing force along axis 256 to pushpin portion 272 of trigger 234 that is greater than the biasing force applied by bias 232 in an upward direction along axis 256 as seen in FIG. 22. In other words, bias 236 is configured to apply a sufficient biasing force such that in the at rest state, trigger 234 is in the locking position with retainers 230 held in their extended positions as shown in FIG. 18. Movement of trigger 234 against bias 236 lessens the force being applied by bias 236, permitting bias 232 to move retainers 230 to their retracted positions.

In the example illustrated, bias 236 comprises one or more compression springs captured between trigger 234 and handle portion 222. Such compression springs are captured between grip portion 274 and interior walls of housing 44, 46 (shown FIG. 5). In other embodiments, other bias members may be employed, such as leaf springs, tension springs and the like.

Figures 23, 24:
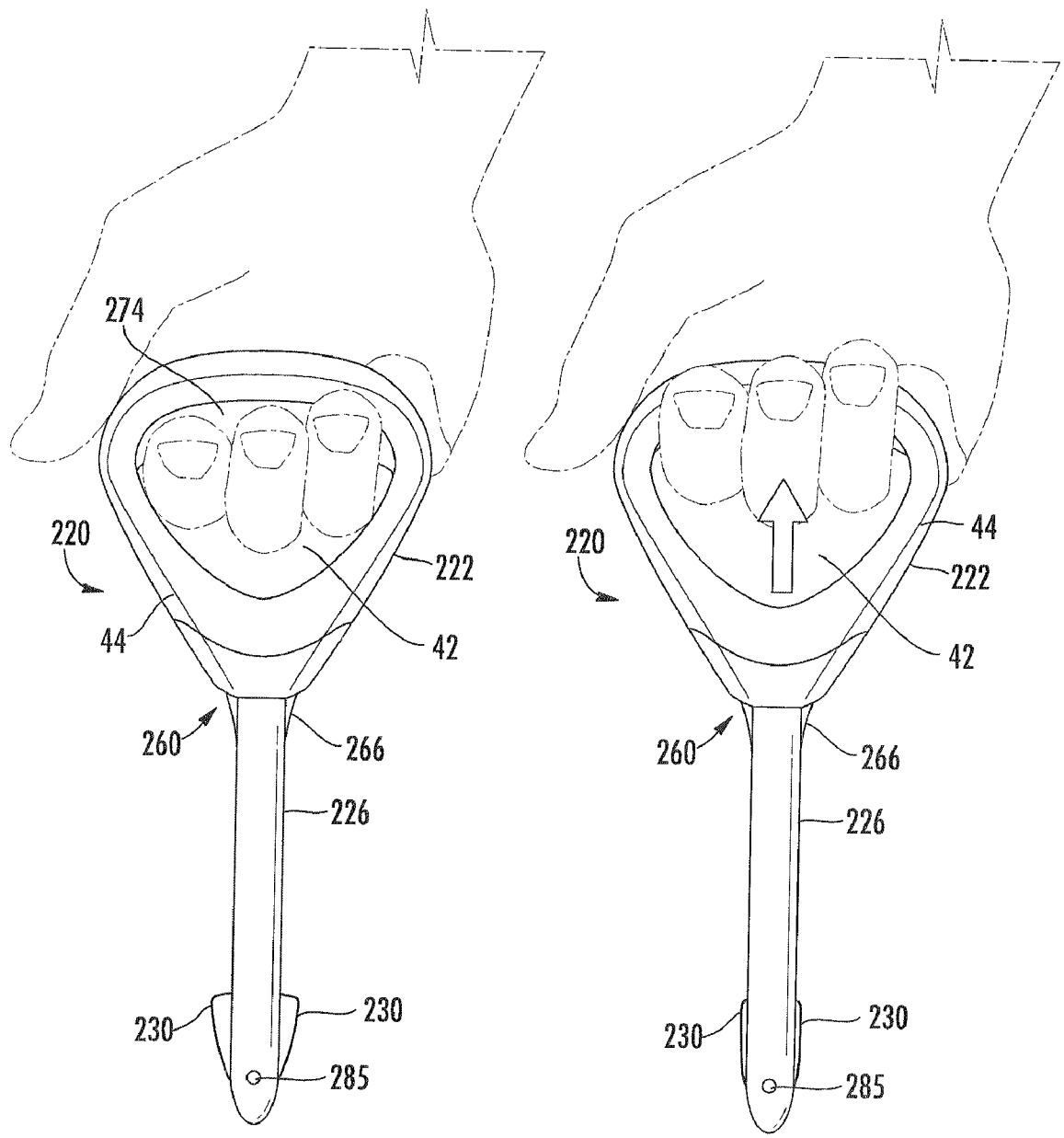
FIG. 23 is a front elevational view of the hitch system of FIG. 18 prior to actuation of the trigger.
FIG. 24 is a front elevational view of the hitch system of FIG. 18 during actuation of the trigger.

FIG. 23 and 24 illustrate use of hitch system 220. As shown, hitch system 220 enables a person to grasp handle portion 122 with a single hand using two or more of his or her fingers. At the same time that hitch system 220 is being grasped, a person may selectively actuate trigger 234 to actuate retainers 230 from their natural extended positions to retracted positions to facilitate insertion or withdrawal of pin portion 226 from openings of a vehicle and/or implement hitch flange. As with hitch system 20, hitch system 220 enables connection and disconnection of an implement and vehicle with a single hand of a person and without requiring a person to reach beneath the hitch flange of the vehicle or implement.

Although the present disclosure has been described with reference to example embodiments, workers skilled in the art will recognize that changes may be made in form and detail without departing from the spirit and scope of the defined subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims are manifestly intended to be as broad as possible. For example, unless specifically otherwise noted, the claims reciting a single particular element also encompass a plurality of such particular elements.

What is claimed is:

1. A hitch system comprising:
   a handle portion;
   a pin portion extending from the handle portion;
   a pair of opposite retainers movable between a retracted positioned with respect to the pin portion and an extended positioned projecting from the pin portion;
   a first bias resiliently biasing the retainers to the retracted position;
   a trigger proximate the handle and movable between a locking position. urging a retainers against a first bias to retain the retainers in the extended positions and a releasing positioned permitting the first bias to move the retainers to the retracted positions; and
   a second bias resiliently biasing the trigger towards the locking position, wherein the handle portion includes a handle loop and wherein the trigger includes a trigger loop portion substantially concentric with the handle loop.

2. The system of claim 1 wherein the first bias comprises a single spring resiliently urging the retainers toward the retracted positions.

3. The system of claim 2, wherein the first bias comprises a single torsion spring.

4. The system of claim 3, wherein the trigger portion shaft portion has a forked end configured to engage each of the retainers.

5. The system of claim 4 wherein the trigger loop portion in the trigger push shaft portion are integrally formed as a single unitary body from one or more polymers.

6. The system of claim 5, wherein the pair of retainers pivot about a same axis.

7. The system of claim 1 wherein the trigger portion includes a trigger push shaft portion extending from the trigger loop portion through the pin portion into engagement with the retainers when the trigger is in the locking position.

8. The system of claim 7, wherein the trigger loop portion and the trigger push shaft portion are integrally formed as a single unitary body.

9. The system of claim 1, wherein the pair of retainers pivot between the extended positions and the retracted positions.

10. A hitch system comprising:
   a handle portion including a handle loop, the handle loop being configured to encircle a hand;
   a pin portion extending from the handle portion;
   a pair of opposite retainers movable between a retracted position relative to the pin portion and an extended position relative to the pin portion;
   a trigger coupled to the retainers and integrally formed as a single unitary body, the trigger extending along the pin portion and least partially within the handle loop;
   a first bias resiliently biasing the retainers to the retracted positions, wherein the trigger is movable between a locking position urging the retainers against the first bias to retain the retainers in the extended positions and a releasing positioned permitting the first bias to move the retainers to the retracted positions; and
   a second bias resiliently biasing the trigger towards the locking position.

11. The system of claim 10, wherein the retainers comprise resiliently flexible portions configured to resiliently flex between a first retracted position relative to the pin portion and a second extended position relative to the pin portion.

12. The system of claim 11, wherein the resiliently flexible portions are configured to interact with the pin portion such that movement of the trigger along an axis of the pin portion moves the resiliently flexible portions between the extended position and the retracted positions.

13. The system of claim 12, wherein the resiliently flexible portions are configured to constrict towards the axis during movement of the trigger along the axis towards the handle portion.

14. The system of claim 10, wherein the first bias comprises a torsion spring.

15. The system of claim 10, wherein the retainers pivot between the retracted positions and the extended positions.

16. The system of claim 15, wherein the retainers pivot about a single axis.

17. The system of claim 10 wherein the trigger portion includes a trigger push shaft portion extending from a trigger loop portion through the pin portion into engagement with the retainers when the trigger is in the locking position.

18. The system of claim 17, wherein the trigger push shaft portion has a forked end configured to engage each of the retainers.

19. The system of claim 17, wherein the trigger loop portion and the trigger push shaft portion are integrally formed as a single unitary body.

20. The system of claim 19 wherein the trigger loop portion and the trigger push shaft portion are integrally formed as a single unitary body from one or more polymers.

* * * * *